United States Patent [19]

Arnold et al.

[11] Patent Number: 4,737,349

[45] Date of Patent: Apr. 12, 1988

[54] TUBULAR REACTOR FOR HETEROGENEOUS REACTIONS

[75] Inventors: Vladimir Arnold; Bernhard Rumo, both of Basel, Switzerland

[73] Assignee: Ciba-Geigy Corporation, Ardsley, N.Y.

[21] Appl. No.: 922,975

[22] Filed: Oct. 24, 1986

[30] Foreign Application Priority Data

Nov. 1, 1985 [CH] Switzerland .......................... 4834/85
Jul. 16, 1986 [CH] Switzerland .......................... 2831/86

[51] Int. Cl.⁴ ................................................ B01F 7/16
[52] U.S. Cl. .................................... 422/226; 422/229; 366/167; 366/332; 534/565
[58] Field of Search ............... 422/135, 224, 225, 226, 422/229, 254; 366/78, 150, 167, 332, 333–335; 62/538, 539

[56] References Cited

U.S. PATENT DOCUMENTS

| | | | |
|---|---|---|---|
| 2,487,458 | 11/1949 | Marnon et al. ........................ | 422/225 |
| 3,438,744 | 4/1969 | Steijner ................................. | 422/225 |
| 3,592,609 | 7/1971 | Honbo .................................. | 422/229 |
| 3,709,664 | 1/1973 | Krekeler et al. ...................... | 422/225 |
| 3,716,590 | 2/1973 | Caraculacu et al. .................. | 260/645 |
| 3,855,368 | 12/1974 | Prochazka et al. ................... | 366/332 |
| 4,243,636 | 1/1981 | Shiraki et al. ........................ | 422/226 |
| 4,268,437 | 5/1981 | Behringer et al. ................... | 260/141 |

FOREIGN PATENT DOCUMENTS 1125175 3/1962 Fed. Rep. of Germany .
2321513 3/1977 France .

Primary Examiner—David L. Lacey
Attorney, Agent, or Firm—Harry Falber

[57] ABSTRACT

A reactor for accelerating heterogeneous reactions and affording an increased yield rate per unit of time and space comprises a cylindrical reactor tube containing in its interior a piston having relatively flat profiling in its skirt in the form of annular ribs and grooves therebetween, inlet conduits leading into the interior of the reaction tube through the bottom clousre thereof, which may also be introduced from above and extend axially through the piston, an outlet tube is provided in the region of the top closure of the reaction tube, the piston is being connected via a piston rod with a vibrator imparting axial oscillatory movement of the piston, these oscillations generating turbulences in the annular piston grooves which effect a thorough mixing of the reaction participants without causing any noteworthy re-mixing of the resulting reaction products with the starting components.

13 Claims, 7 Drawing Sheets

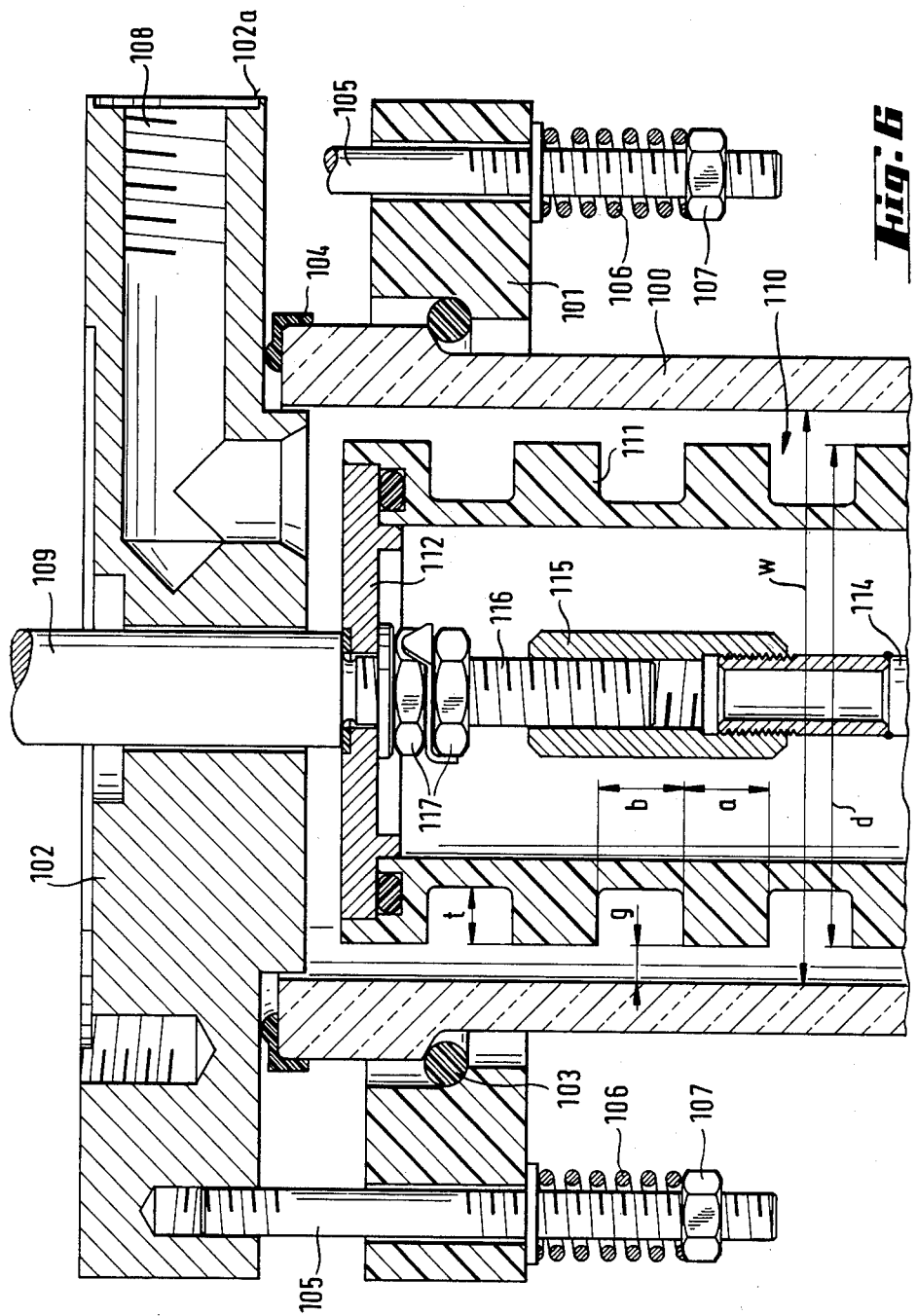

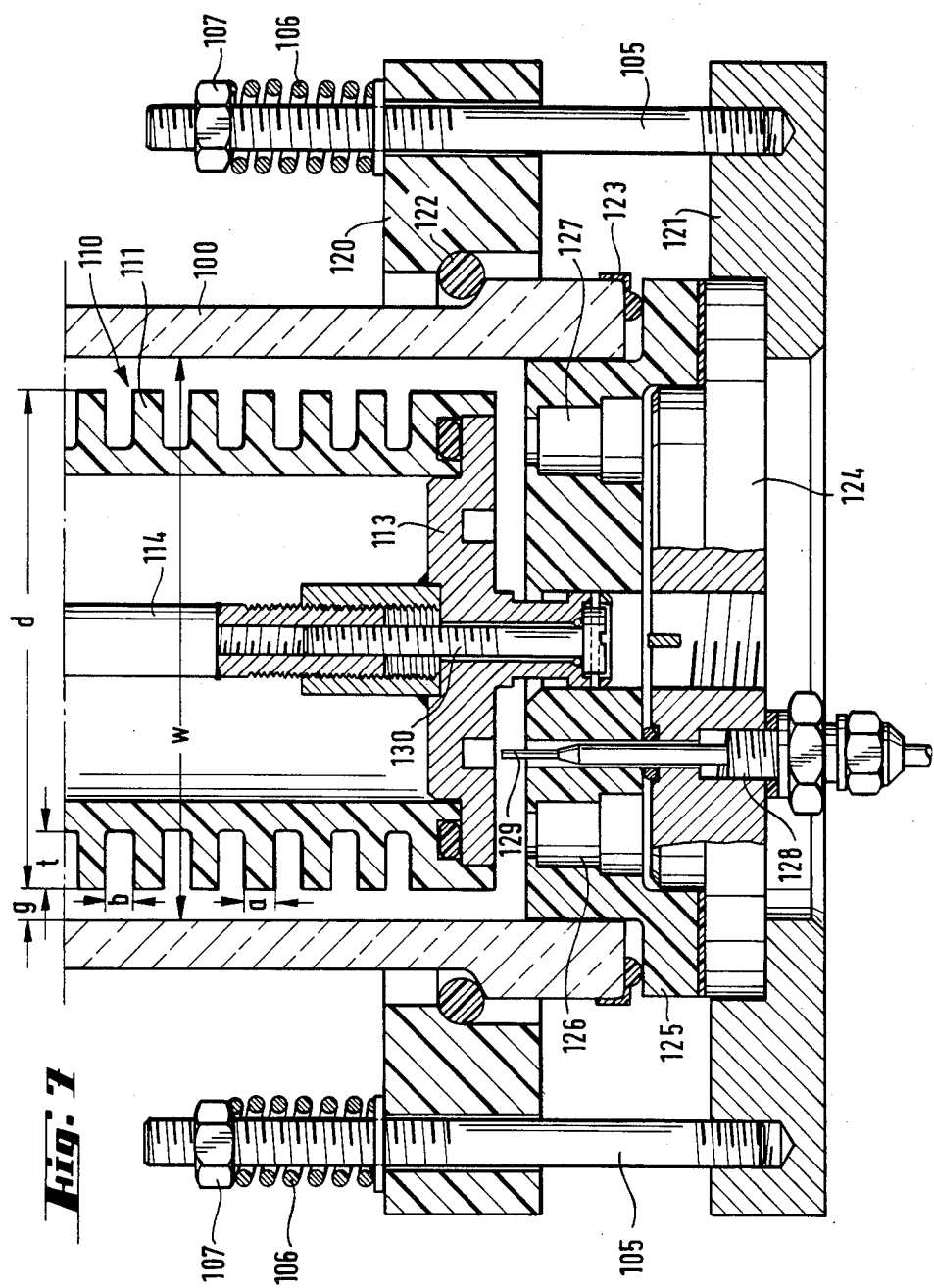

TUBULAR REACTOR FOR HETEROGENEOUS REACTIONS

BACKGROUND OF THE INVENTION

This invention relates in a first aspect to a tubular reactor, and more particularly to such reactor comprising a reactor tube having two open tube ends, inlet means for the substances to be processed, at one of these tube ends, and at least one outlet for the product to be obtained at the other tube end, inset means in the reactor tube being axially displaceable therein, as well as drive means for an axial to-and-fro displacement of the inset means relative to the reactor tube.

In a second aspect, the invention relates to the use of the aforesaid reactor for continuously performing heterogeneous reactions therein. However, the reactor is also suitable for performing heterogeneous reactions the heat exchange of which is to be accelerated.

In a third aspect, the invention relates to a novel process for continuously performing a heterogeneous reaction.

In former times chemical reactions were carried out in apparatus which was specially designed for a specific reaction. In the beginning of this century factors influencing chemical reactions such as the influence of flow, mixing, distribution of sojourn times and the transfer of substances and of heat were more generally investigated. The concept of chemical reaction techniques originated only in the mid-Fifties. The field of reactor development is therefore a relatively young one and, correspondingly, comprises many problems to be solved.

A particular problem, hitherto unsolved in a satisfactory manner in the field of reaction techniques, is the control of heterogeneous reactions. Particularly in those cases in which a re-mixing of reactants and reaction products has a negative influence on the alternate outcome of the process, e.g. on a possible subsequent reaction step, and which require a thorough mixing in order to accelerate the reaction, the selection of a suitable reaction apparatus becomes difficult. Hereinafter, a few known reactor types shall be briefly discussed.

As a first reactor type a vessel equipped with a stirrer is well-known. This apparatus comprises a vessel in the interior of which the stirring elements, e.g., rotating propellers or vane elements are lodged. With the aid of stirrer-equipped vessels, it is possible to attain an excellent degree of mixing. As, however, the starting components as well as the resulting final product are present in the same vessel and are being continuously mixed with each other, a re-mixing thereof is unavoidable, as it is inherent in the technical system.

A further frequently used type of reactor is the tubular reactor which comprises a cylindrical tube into which the starting components are introduced at one end thereof. Due to the continuous flow of additional material into the tube, the starting components are pushed through the tube while reacting with each other during their travel through the tube, while the resulting end products leave the tube at the other end thereof. As the flow of subsequent components pushes those already in the tube ahead of them, remixing is relatively minor. On the other hand, due to the laminar flow of the substances through the tube, mixing of the same is not particularly satisfactory. Moreover, tubes of great length may be required in order to guarantee the necessary sojourn times for completing the reaction.

A combination of a tubular reactor and stirrer-equipped vessel is provided by subdividing the tubular reactor into several chambers, each of which is designed as a stirrer-equipped vessel, and which are arranged as a series of cascades, wherein the components do not remain stationary in the stirrer-equipped chambers during mixing, but flow through the same. However, this combination suffers from several drawbacks. Centrifugal forces generated by the stirrer element cause a sedimentation of particles. Furthermore, the angular velocity of the stirrer element is not the same at all points, but is smallest near the driving shaft of the stirrer so that no uniform mixing can be attained. As a further drawback the component parts of the reactor are difficult to clean.

Further reactors have been described, for instance, in the French patent publication No. 2,321,513, the German patent publication No. 1,125,175, and the U.S. Pat. Nos. 3,716,590 and 4,268,437. These known reactors are badly suited or completely unsuitable for carrying out heterogeneous reactions.

OBJECTS AND SUMMARY OF THE INVENTION

In its first aspect, the invention sets out to solve the task of providing, according to the principal object of the invention, a cylindrical reactor which
  (a) is of relatively short length,
  (b) affords an acceleration of the reaction to be performed therein, in comparison with known reactors, thanks to intensive mixing of the reaction components, while
  (c) being free, to the highest possible extent, from re-mixing of reaction products and starting components, and
  (d) being easy to clean.

As mentioned before, it is another object to provide a reactor according to the invention satisfying the abovedefined objects, which is adapted for continuously performing heterogeneous reactions such as, in particular, the diazotization of amino compounds which are insoluble in an aqueous medium, such as 4-aminoazobenzene. When a diazotization reaction does not occur sufficiently rapidly, there will occur an undesirable decomposition of the nitrate accompanied by the development of gases. In order to accelerate heterogeneous reactions, it has hitherto been the custom to grind the reaction participant which is insoluble in the reaction medium, superfinely, and/or to add surface-active agents to the reaction medium, and/or to add organic solvents. It is a further object of the invention to largely or to completely avoid such additional measures.

In its second and third aspects, the invention sets out to solve the task of accelerating heterogeneous reactions by attaining the objects of
  (a) achieving a better, more thorough mixing of the reaction components and thereby an improved exchange of material,
  (b) without the occurrence of substantial re-mixing, thereby
  (c) avoiding undesirable secondary reactions, and
  (d) thereby increasing the yield.

The objects of the first invention aspects are attained in accordance with the invention, in a reactor of the initially described type, in which the inset means consist essentially of a piston or plunger having in its piston skirt circumferential grooves whose depth t is less than about half the maximal radius of the piston taken in a plane radially to the longitudinal piston axis.

Preferred embodiments of the reactor according to the invention have at least one of the following features:

(1) the distance g between the piston skirt and the internal wall surface of the reactor tube amounts to about 0.5 to 3 times the depth t of the circumferential grooves;

(2) the width b of the circumferential grooves amounts to 0.2 to 2 times the depth t of the circumferential grooves, and is preferably from about half to the same as the said depth t between adjacent annular ribs of the piston;

(3) the distance a of adjacent circumferential grooves from each other is about 0.5 to 2 times the width b of the circumferential grooves (i.e., a is the axial height of each rib);

(4) the circumferential grooves have a substantially rectangular cross section, and preferably so have the ribs;

(5) at least one inlet is extended through the piston and the lower piston end is provided with an inlet valve;

(6) the lower piston end is designed at least partly as a static mixer;

(7) the frequency of the oscillation of the piston amounts to from 0.1 cycles to one kilocycle, and the oscillation stroke (amplitude) amounts to from 0.1 to 30 mm;

(8) the gap between the piston and the tube amounts to 0.05 to 5 times the oscillation stroke;

(9) the width of the circumferential grooves amounts to 0.05 to 5 times the oscillation stroke of the piston;

(10) the distance between adjacent circumferential grooves amounts to 0.05 to 5 times the oscillation stroke; and/or

(11) the distance between the piston end and the adjacent reactor tube bottom corresponds to the width of the circumferential grooves, and at least to the oscillation stroke of the piston.

The objects of the second and third aspects of the invention are attained by using the reactor according to the first invention aspect for continuously performing heterogeneous reactions, and by a process for carrying out such a heterogeneous reaction continuously, which comprise, in accordance with the invention (a) introducing simultaneously and continuously into the lower end of a reactor apparatus or system, which comprises a substantially vertically disposed reaction tube or zone, at least one suspension, each such suspension being introduced containing a reaction participant being insoluble in the reaction medium, and at least one solution, each such solution containing a reaction participant being soluble in the reaction medium;

(b) effecting periodic linear up-and-down movements of piston means having relatively flat circumferential grooves in the skirt thereof and being lodged in said reaction tube or zone, thereby thoroughly mixing and conveying upwardly through said tube or zone that at least one suspension and that at least one solution, while avoiding any substantial re-mixing of volume units having different sojourn times in the reaction tube or zone; and (c) removing the resulting mixture containing the reaction product from the upper end of the reaction tube or zone.

The resulting mixture is then worked up in a manner known per se in order to isolate the reaction product. Preferably, the reaction product is soluble in the reaction medium.

More in particular, the reactor according to the invention is used for continuous diazotization of an amino compound being insoluble in an aqueous medium, and comprises introducing simultaneously and continuously into the lower end of the reactor tube an aqueous suspension of the amino compound, an aqueous nitrite solution and an aqueous solution of hydrochloric acid, and removing from the upper end of the reaction tube a solution of a diazonium compound being soluble in the reaction medium. Thus, an aqueous sodium nitrite solution can be added to a suspension of 4-aminoazobenzene containing preferably a surfactant, and the resulting nitrite-containing suspension can be introduced simultaneously with a hydrochloric acid solution into the lower end of the reaction tube.

In a preferred mode of carrying out the process according to the third invention aspect, an aqueous suspension of an amino component being insoluble in aqueous media is diazotized with an aqueous nitrite solution and an aqueous hydrochloric acid solution in the reaction zone, and removing from the upper end of the latter a solution of the resulting diazonium compound in the aqueous reaction medium. Thus, an aqueous sodium nitrite solution can be added to a suspension of 4-aminoazobenzene in water, containing preferably a surfactant, and the resulting mixture can be introduced simultaneously with a hydrochloric acid solution into the lower end of the reaction tube.

The foregoing as well as other objects and advantages of the present invention and the particular aspects thereof will become apparent by reference to the following detailed description thereof with reference to the accompanying drawings which illustrate, by way of example, preferred embodiments of installations according to the invention.

BRIEF DESCRIPTION OF THE DRAWINGS

In the drawings

FIG. 6 shows the upper region of a fifth, preferred embodiment of the reactor according to the invention; and FIG. 7 shows the lower region of a sixth embodiment of the reactor according to the invention, which is similar to the embodiment of FIG. 6, the only difference being in the configuration of the piston therein.

DETAILED DESCRIPTION OF THE EMBODIMENTS SHOWN IN THE DRAWINGS

Figure 1:
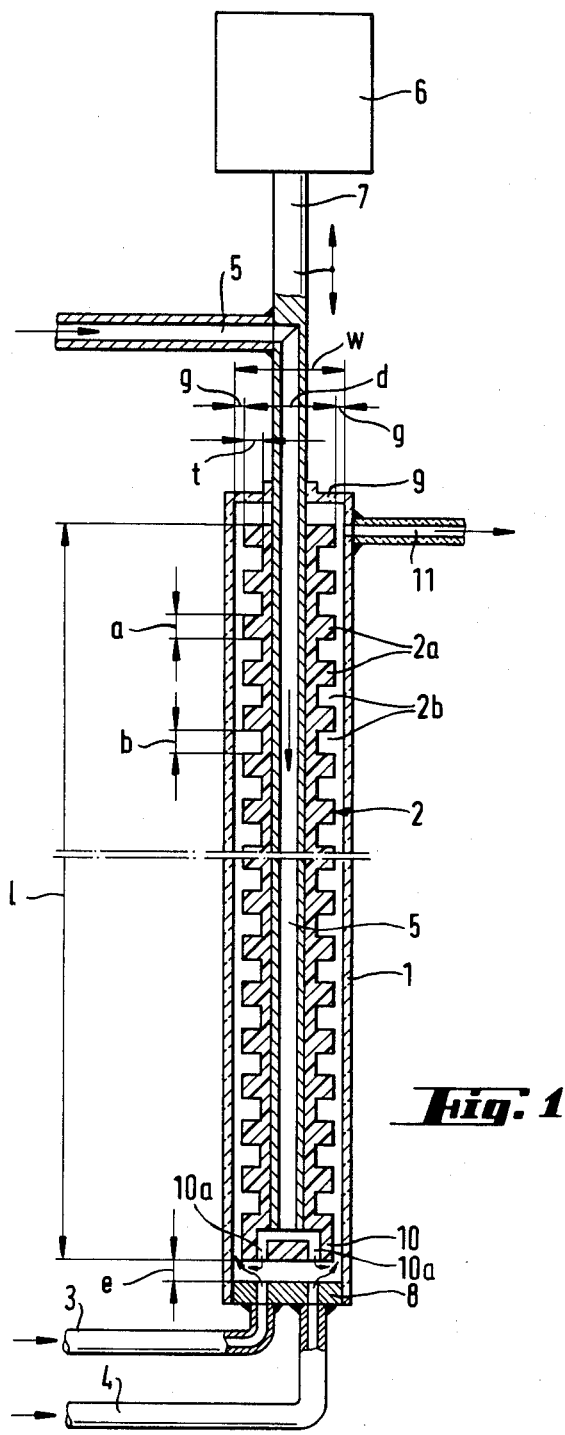
FIG. 1 shows schematically a first embodiment of the tubular reactor according to the invention comprising a single reactor tube.

The reactor embodiment shown in FIG. 1 consists essentially of a cylindrical tube 1 whose lower end is provided with a closure member 8 and whose upper end is provided with a top closure or lid member 9. The reactor tube 1 is made preferably of glass and contains in its interior an elongated piston 2 having a profiled circumferential sidewall the profile of which consists of radially extending flange-like ribs 2a with annular interspaces 2b between each pair of adjacent ribs.

The piston 2 is connected by means of a linkage system 7 with a vibrator 6 or a similar suitable device for generating oscillations of the piston 2 along its longitudinal axis. Inlet tubes 3, 4 and 5 serve to convey substances to be reacted with each other into the interior of the reactor tube 1 in the vicinity of the closure member 8 at the lower tube end.

Of these inlet tubes, the tube 5 extends through a part of the linkage system 7 and axially downwardly through the piston 2 to open at the lower end 10 thereof. This lower piston end 10 can be designed as a static mixer and is provided with one or several openings 10a through which reactant substances can be supplied to the interior of the reaction tube. The two inlet tubes 3 and 4 also lead through the closure member 8 into the lower end of the reaction tube 1, while the reaction product and byproducts of the reaction can leave the reactor tube 1 by way of an outlet tube 11 which is connected to the upper region of the tube in the vicinity of the top closure 9.

Measuring points can be provided in several regions of the reactor tube 1 in order to be able to survey and check the kinetics of the reaction.

Experience has shown that an advantageous frequency of the oscillations ranges from 0.1 cycle to 1 kilocycle. As a basis for the dimensioning of the reactor, there can be used the oscillation stroke of the piston 2 which can vary, depending on the embodiment used, from 0.1 mm to about 30 mm. The width g of the gap between the interior wall of the reactor tube 1 and the external cylinder of the piston 2 whose diameter d is equal to the rib diameter taken in a plane radial to the piston axis, preferably amounts to from 0.05 times to 5 times the oscillation stroke of the piston 2. The thickness of the flange-shaped ribs 2a, i.e. the height a of each rib in axial direction, preferably amounts to from about 0.05 times to 5 times the oscillatory stroke, and the distance between adjacent ribs, b, i.e. the axial width of each groove 2b between them, preferably is in the same range of dimensions, i.e. from about 0.05 times to 5 times the oscillatory stroke. The distance e between the lower piston end 10 and the reactor bottom closure member 8 is preferably of the same size as the width of the circumferential grooves but must, of course, be at least large enough to permit unobstructed oscillations of the piston.

The reactor functions in the following manner:

The reactant components which enter the reaction tube 1 in the lower region thereof flow upwardly through the tube, and the resulting reaction products with or without residual starting components leave the upper region of the reaction tube 1 through the outlet tube 11. The periodic longitudinal oscillation of the piston 2 cause the formation of turbulences of flow of the substances in the interspaces 2b between the ribs 2a of the piston 2. These turbulences produce an intensive mixing of the starting components. Moreover, these turbulences have a cleaning effect in the interspaces 2b, so that no intermediary or final reaction products will be retained therein and be re-mixed with upwardly flowing starting components. These cleaning properties are particularly important in the case of heterogeneous reactions whose reaction velocity is directly proportional with the thoroughness of mixing of the starting components.

Figure 2:
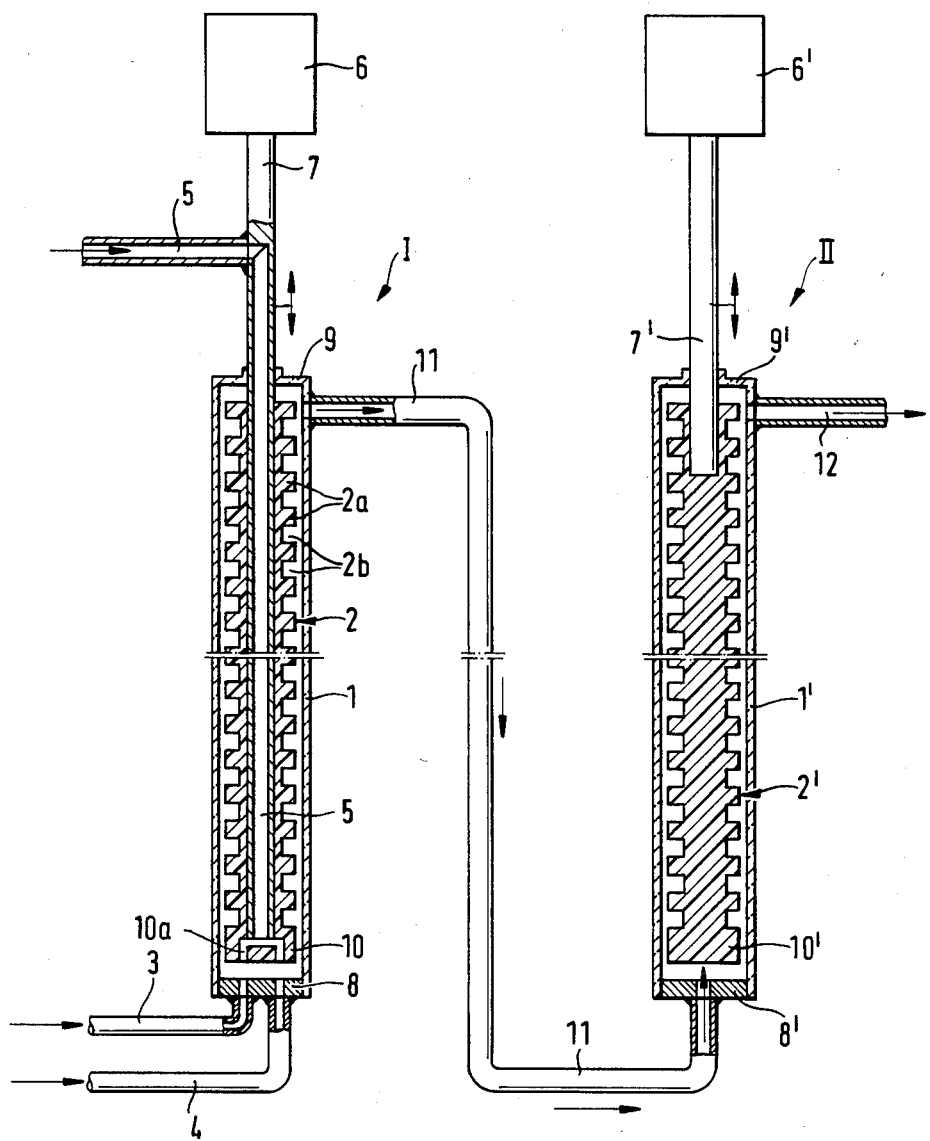
FIG. 2 shows another embodiment comprising two reactor tubes in cascade arrangement.

In FIG. 2 there are shown two reactor tubes 1 and 1' connected in series, i.e., in cascade arrangement. The outlet pipe line 11 of the first reactor tube 1 leads in this arrangement to the closure 8' at the lower end of the second reactor tube 1' and the reaction mixture introduced through the pipe line 11 into the reactor tube 1' passes upward through the latter and leaves the reactor tube 1' through the outlet tube 12 at the upper end of the reactor tube 1'. The other parts of the reactor tube 1' being designated by 2', 6', 7', 9' and 10' are identical with the correspondingly designated parts of the reactor tube 1. With the aid of such cascade arrangements, the effective length of the reaction tube can be multiplied as desired.

Figure 3:
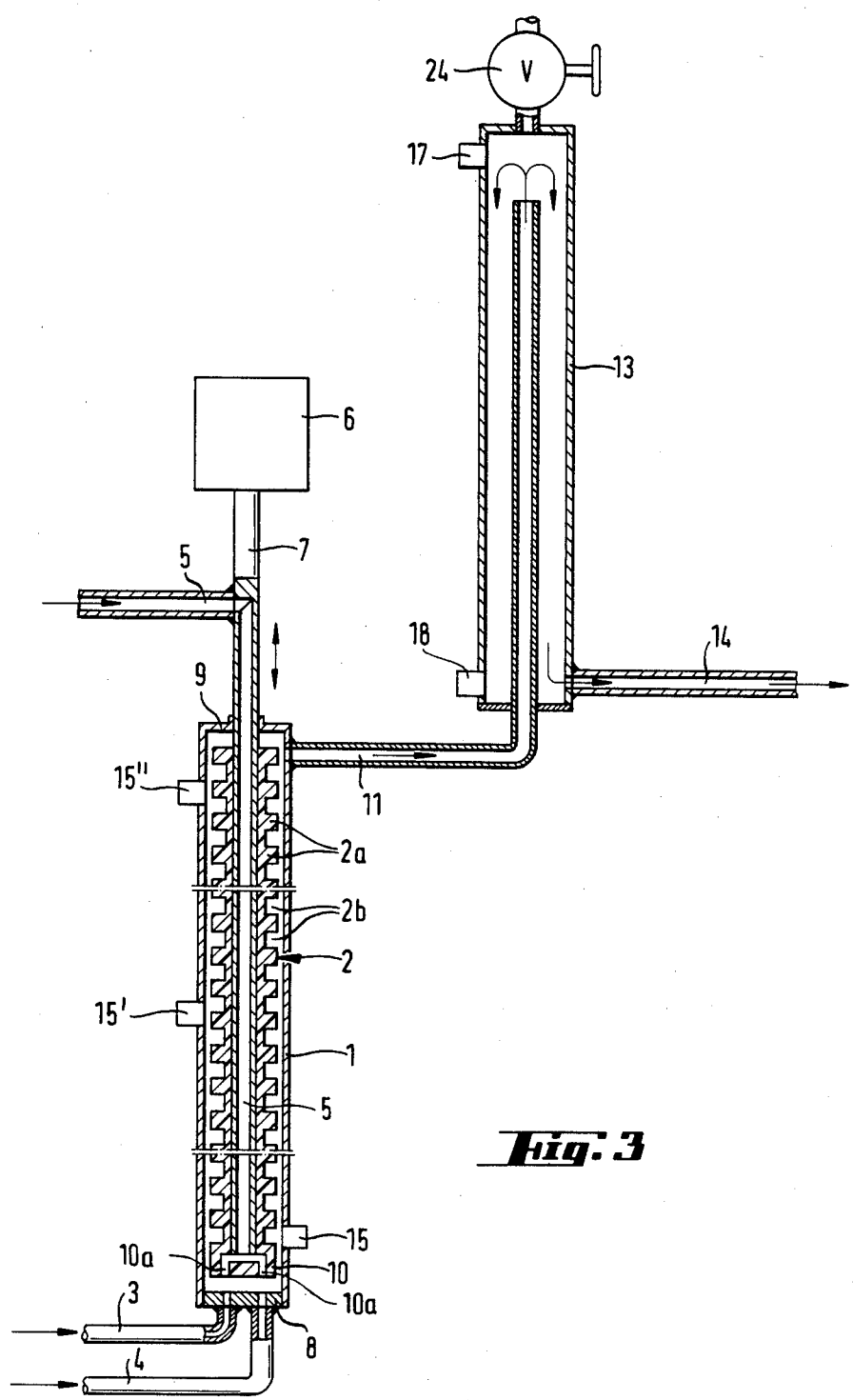
FIG. 3 shows a third reactor embodiment designed for diazotization reactions.

In FIG. 3 there is shown an embodiment of the reactor according to the invention which is particularly suited for carrying out diazotizations therein. The outlet pipeline 11 is connected in this embodiment with a pressure relief vessel 13 having the configuration of an upright cylindrical tubular element which is provided at its lower end with an outlet 14. The pipeline 11 extends axially upwardly in the interior of the vessel 13 and opens in the vicinity of the closed upper end of the same. The entire reactor is provided with a number of measuring points 15, 15' and 15" of the reactor tube 1 and 17 and 18 at the top region and the bottom region, respectively, of the pressure relief tube 13, whereby reaction kinetics can be traced.

Figure 4:
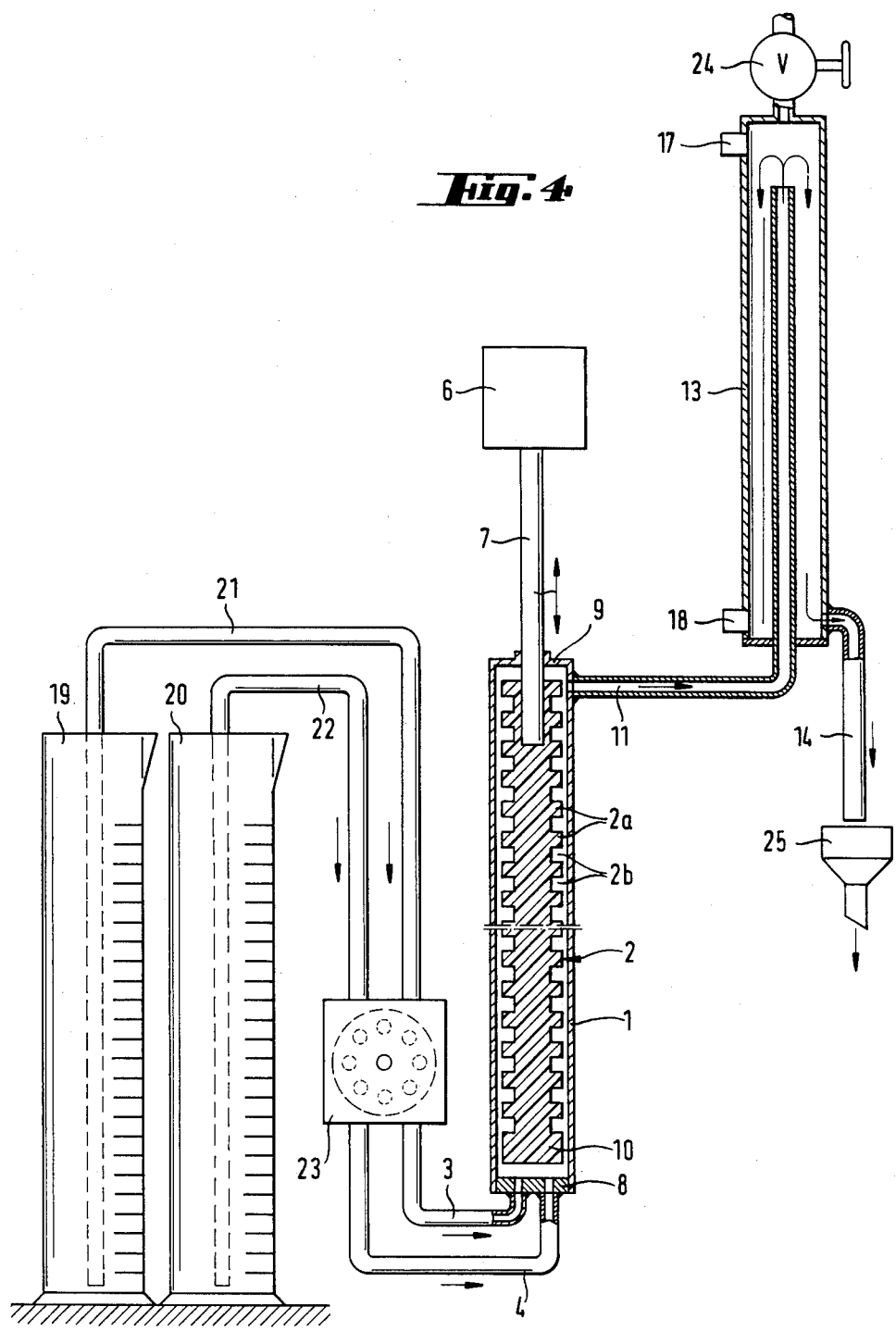
FIG. 4 shows yet another reactor embodiment designed for diazotization reactions.

In FIG. 4, there is shown an embodiment of the reactor according to the invention in an apparatus for the diazotization of 4-aminoazobenzene. Two mearuring cylinders 19 and 20 having each a capacity of 500 milliliteres are connected via the conduits 3 and 4, respectively, with the closure 8 at the lower end of the reactor tube 1 containing the oscillatory piston 2. A hose squeezing-stroke pump 23, for instance of the ISMATEC MV-GE type sold by the company ISMATEC SA, in CH-4000 Basel, Switzerland, with multiple seizure, is interposed in the path of the two conduits 3 and 4. In a preferred design the volume of the reactor tube 1 may be of 33 milliliters. The linkage system 7 comprises a piston rod which is connected with the upper end of the piston 2 as well as with a commercially available vibrator 6 adapted for generating oscillations of the piston 2 along the longitudinal piston axis. The frequency of the oscillation of the vibrator 6 amounts, for instance, to 50 or 60 cycles, and the amplitude of the oscillation can be freely adjusted within the range from 0 to 3 mm. An outlet pipeline 11 leads from the upper region of the reactor tube 1 into the lower end of a pressure relief vessel 13 and opens in the upper region thereof. A vent valve 24 is provided in the top wall of the vessel 13, and a discharge pipe 14 leads from the lower region of the vessel 13 to a suction filter, e.g. a porcelain funnel 25.

Figure 5:
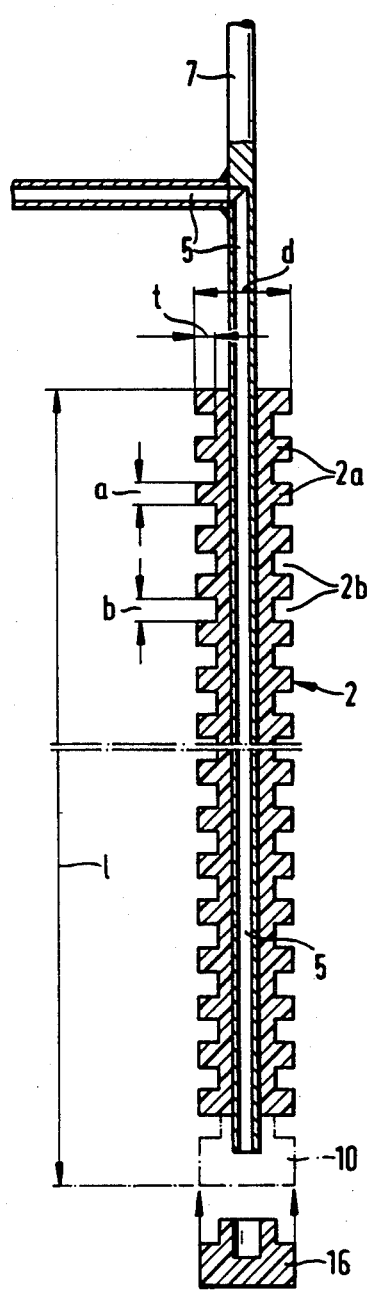
FIG. 5 shows a slightly different design of the lower piston end usable in anyone of the foregoing embodiments.

In the embodiment of the piston 2 shown in FIG. 5 which is otherwise similar to the piston shown in the embodiment in FIG. 1, the branch of the inlet tube 5 which extends axially downwardly through the piston 2 protrudes with its lower end from the bottom end of the piston 2 and can be closed with a stopper member 16 which is detachable and can either close off the lower end of tube 5 or it can be provided with orifices. In both cases this stopper member can be designed as a static mixer.

A preferred design of the reactor in this and the other embodiments shown in FIGS. 1 to 4 comprises a metal tube having a wall thickness of 5 mm. The piston consists of a tubular body of synthetic resin material, preferably Teflon (tetraperfluoroethylene) into the outer cylindrical wall of which a number of circular grooves 2b has been cut. The length 1 of the piston in a preferred configuration amounts to 300 mm, the diameter d of the transverse cross sectional area amounts to 12 mm, the circumferential end wall of each rib 2a, which is left standing between the grooves 2b, has a height a, in axial direction, of 3 mm, and the distance b between two adjacent ribs 2a also amounts to 3 mm. The depth of each groove 2b in a plane radial to the longitudinal piston axis is 2.5 mm. The internal width w of the reactor tube 1 amounts to 14 mm, so that the distance between the outer wall of the piston 2 and the internal wall of the reactor tube 1 amounts to one mm on each side.

FIG. 6 shows in axial sectional view on a scale of 1:1 a preferred embodiment of the reactor according to the invention. The lower part of this reactor corresponds largely with the lower reactor half shown in FIG. 7; however, the piston 110 in the upper reactor half of FIG. 6 differs by its broader ribs 111 and its wider interspaces between them from the narrower ribs and interspaces of the piston 110 in the lower reactor half shown in FIG. 7.

The reactor tube 100 in the embodiment of FIG. 6 is made preferably of glass and is mounted in its upper end region in two parallel flanges 101 and 102 which are made preferably of metal. An O-ring 103 and a flat sealing member 104 afford the necessary sealing and the elastic movability of the glass and metal parts relative to each other in the joints between them. The two flanges 101 and 102 are secured together by means of screw bolts 105, tension springs 106 and tightening nuts 107.

The upper flange 102 constitutes a cover lid for the reactor tube 100 by having a downwardly projecting disc part which fits sealingly into the open upper end of the tube 100, and contains an outlet duct 108 for the discharge of reaction products which has an entry orifice in the underside of the said disc part and an exit opening in the circumferential sidewall 102a thereof. The lower end of a vibrator rod 109 extends through a central opening of this flange into the upper region of the interior of the hollow piston 110.

This hollow piston 110 is housed axially in the interior of the reactor tube 100 and consists essentially of a piston shell having a cylindrical internal wall surface and a profiled external surface, an upper piston lid 112 (FIG. 6) and a lower piston lid 113 (FIG. 7) closing off the hollow interior of the piston shell, and an axially extending connecting rod 114 which secures the two lids 112 and 113 together with bias. The upper end of the connecting rod 114 wears an external threading which is screwed into the internal threading of a bushing 115 which is in turn screwed onto the external threading of an extension member 116 of the vibrator rod 109. This extension member 116 traverses with a tight seal a central opening in the upper piston lid 112 and is secured in the lid 112 by means of lock nuts 117, whereby the axial upward and downward movements of the vibrator rod 109 are transmitted via the upper piston lid 112 to the piston 110.

The construction of the lower reactor half in the embodiment, the upper half of which is shown in FIG. 6, corresponds, with the above-mentioned exception of the piston configuration, to that shown in FIG. 7. In this lower half the lower end of the reactor tube 100 is mounted firmly in position by means of the two flanges 120 and 121, while an O-ring 122 and a flat sealing member 123 are provided in a corresponding manner to afford the necessary elasticity of the joint between the reactor tube 100 and the two flanges, and the required tight seal. The lower flange 121 supports a base plate 124 which in turn bears an internal reactor tube bottom part 125 which is fit sealingly into the lower end of the reactor tube 100. The two bottom elements 124 and 125 are provided with channels 126 and 127 which are only partly visible in FIG. 7 and serve for the supply and withdrawal of material to and from the interior of the reactor tube 100. Furthermore, a temperature measuring device 128 extends through the two bottom elements 124 and 125 and has a detecting tip 129 protruding into the interior of the reactor. The internal bottom part 125 is attached to the lower end of the connecting rod 114 in the bottom region of the reactor tube interior by means of a fastening screw 130.

FIGS. 6 and 7 being on a scale of 1:1 illustrate the dimensions of two different profiles of the external piston wall being constituted by annular ribs 111. In FIG. 6, the thickness of the ribs 111 in axial direction is larger, in FIG. 7 it is smaller. For especially favorable results, the following relationship should be observed between the depth t of the grooves between adjacent ribs 111, the thickness a of the ribs 111, i.e. the axial length of the circumferential sidewall of each of them, the width b of the grooves between each pair of adjacent ribs taken in axial direction, the maximal piston diameter d, and the spacing g between the cylinder defined by the circumferential sidewalls of the ribs 111 and the internal wall surface of the reactor tube 100, the sum of d+2 g being equal to the internal width w of the reactor tube 100, and should not be exceeded or fallen short of in practice:

t=t
g=from 0.5xt to 3xt
b=from 0.2xt to 2xt, preferably 0.5xt to 1.0xt
a=from 0.5xb to 2xb
d approximately 4xt.

By observing these ranges of dimensions there is achieved an optimal mixing of the reaction components without causing a re-mixing, worth mentioning, of reaction products with starting components.

In the example carrying out the process according to the invention in practice, given below, parts by weight have the same relationship to parts by volumes as have grams to milliliters.

EXAMPLE

One half part by weight of a wetting agent consisting of the condensation product obtained from p-tertiary-octylphenol and ethylene oxide in a molar ratio of 1:8 is dissolved in 200 parts of water.

To the resulting solution there are added 100.2 parts by weight of ground 4-aminobenzene of technical grade (98.3% pure) and 125 parts by volume of 4-normal aqueous sodium nitrite solution to afford a molar ratio of 4-aminobenzene and sodium nitrite of 1:1. Water is added to the resulting suspension to make a total of 500 parts by volume and the whole is homogenized with the aid of a vibromixer.

One hundred twenty two parts by weight of hydrochloric acid having a HCl content of 33% by weight are made up to a total of 500 parts by volume by adding 390 parts of water. The HCl-amount present in the resulting solution and the 4-aminobenzene amount of the above-described suspension are in a molar ratio of 2.2:1.0.

The above suspension and the hydrochloric acid solution are fed continuously by way of the lines 3 and 4 by means of the squeezing-stroke pump simultaneously into a reactor according to the invention as shown in FIGS. 3 or 4. The reaction is carried out quasi-adiabatically at room temperature (20° C.). The resulting reaction mixture is discharged via the exit line 14 and directly filtered off. By adjusting the sojourn times in the reactor to from 20 to 60 seconds, a yield rate of 98 to 99% by weight was obtained. No development of gas was observed. A throughput rate of from one to 3 moles per hour was achieved.

We claim:

1. A tubular reactor comprising a reactor tube having two open tube ends, closure means for each of said tube ends, inlet means at least at one of said tube ends for substances to be processed, at least one outlet at the other tube end for a product to be obtained, inset means in the reactor tube being axially displaceable therein, and drive means for an axial to-and fro displacement of said inset means relative to the reactor tube, said inset means consisting essentially of a piston having a longitudinal piston axis, a piston skirt and, in said piston skirt, circumferential grooves whose depth t is less than about half the maximal radius of the piston taken in a plane radially to said piston axis.

2. The reactor of claim 1, wherein the distance g between the piston skirt and the internal wall surface of the reactor tube amounts to about 0.5 to 3 times the depth t of the circumferential grooves.

3. The reactor of claim 1, wherein the width b, taken in the direction of said piston axis, of each of the circumferential grooves amounts to 0.2 to 2 times the depth t of the circumferential grooves.

4. The reactor of claim 3, wherein said width b is from about half to the same as said depth t.

5. The reactor of claim 1, wherein the distance a of adjacent ones of the circumferential grooves from each other is about 0.5 to 2 times the width b of each of the circumferential grooves.

6. The reactor of claim 1, wherein the circumferential grooves have a substantially rectangular cross section.

7. The reactor of claim 1, further includes at least one inlet means extends axially through said piston and entering said piston through one piston end for conveying substances into the reactor tube.

8. The reactor of claim 7, wherein said one piston end, through which said additional inlet means enters, is designed at least partly as a static mixer.

9. The reactor of claim 1, wherein said drive means are constructed so as to impart to said piston a frequency of oscillation amounting to from 0.1 cycle to one kilocycle, and an oscillation stroke amounting to from 0.1 to 30 mm.

10. The reactor of claim 9, wherein the distance g between said piston and said internal tube wall amounts to 0.05 to 5 times the oscillation stroke of said piston.

11. The reactor of claim 9, wrein the width b, taken in the direction of said piston axis, of said circumferential grooves amounts to 0.05 to 5 times the oscillation stroke of the piston.

12. The reactor of claim 1, wherein the distance a between adjacent ones of circumferential grooves in the direction of said piston axis amounts to 0.05 to 5 times the oscillation stroke of said piston.

13. The reactor of claim 1, wherein said reactor tube comprises a bottom defined by one of said closure means, and the distance between said reactor tube bottom and the piston end adjacent said tube bottom corresponds to said width of the circumferential grooves, and at least to the length of the to-and-fro displacement of said piston.

* * * * *